C. W. H. BLOOD.
TRUING DEVICE FOR TRUING SHAPED CUTTERS IN RUNNING CUTTER HEADS.
APPLICATION FILED SEPT. 22, 1909.
944,010.
Patented Dec. 21, 1909.
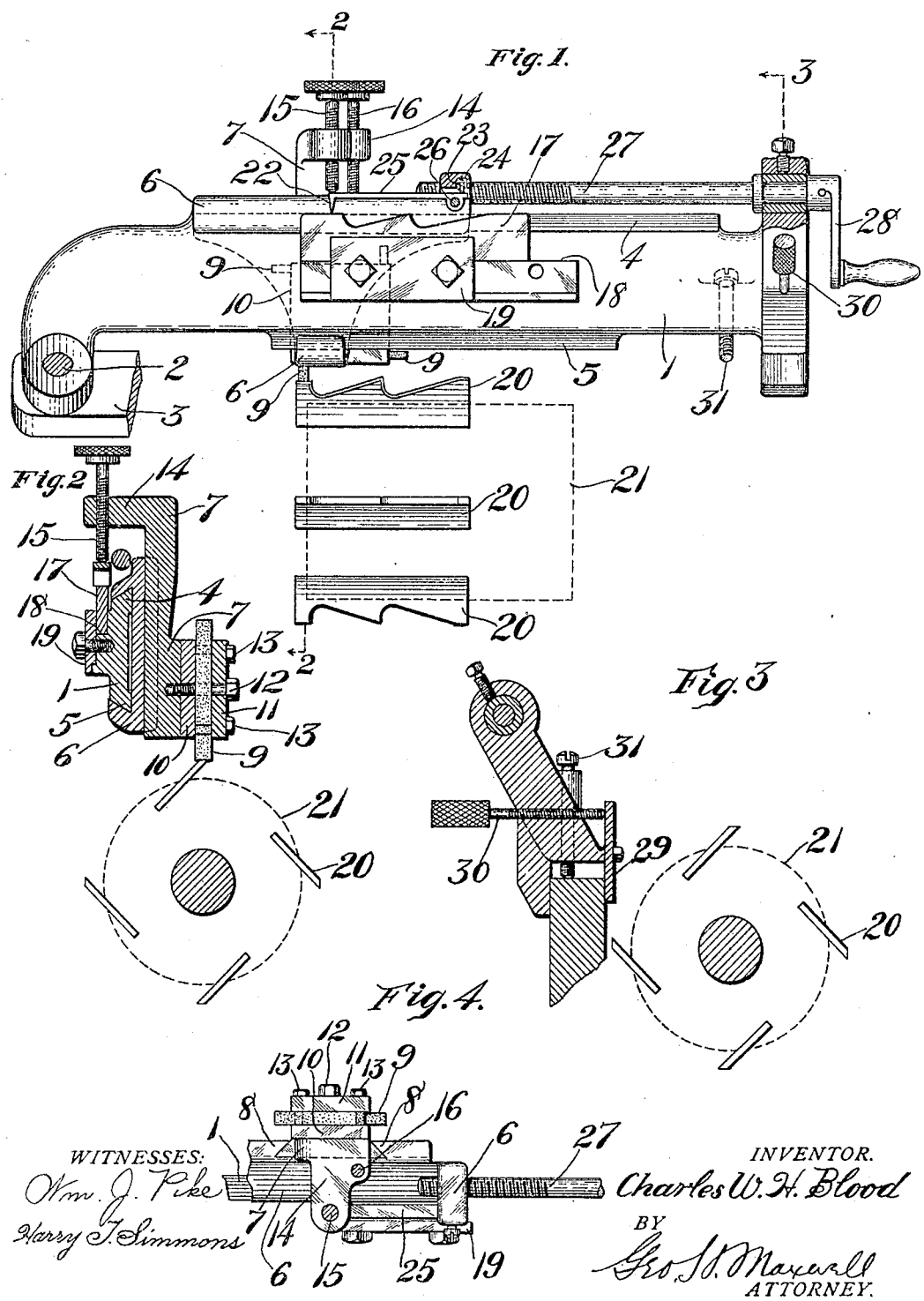
WITNESSES:
Wm. J. Pike
Harry J. Simmons
INVENTOR.
Charles W. H. Blood
BY
Geo. H. Maxwell
ATTORNEY.

UNITED STATES PATENT OFFICE.

CHARLES W. H. BLOOD, OF BOSTON, MASSACHUSETTS, ASSIGNOR TO S. A. WOODS MACHINE COMPANY, OF BOSTON, MASSACHUSETTS.

TRUING DEVICE FOR TRUING SHAPED CUTTERS IN RUNNING CUTTER-HEADS.

944,010.  Specification of Letters Patent.  Patented Dec. 21, 1909.

Application filed September 22, 1909. Serial No. 518,986.

*To all whom it may concern:*

Be it known that I, CHARLES W. H. BLOOD, a citizen of the United States, residing at Boston, in the county of Suffolk and State of Massachusetts, have invented an Improvement in Truing Devices for Truing Shaped Cutters in a Running Cutter-Head, of which the following description, in connection with the accompanying drawings, is a specification, like numerals on the drawings representing like parts.

My invention is an improvement on the truing device of my Patent No. 858,564 July 2, 1907, whereby shaped or formed cutters in a cutterhead rotating at high speed may all be trued or brought into identically the same cutting planes notwithstanding that their edges are not straight.

In carrying out my invention I make the grinder or truing tool and its carriage movable transversely as well as longitudinally of the swinging guide bar and provide on the latter a fixed profiling pattern engaged by a follower which correspondingly controls the transverse movement of the carriage and hence of the truing tool.

In its preferred embodiment my invention includes a rider having a knife edge for bearing on the pattern and governing said follower. Also in its preferred embodiment the invention includes means for converting the apparatus from a profiling truing device to a straight-edge-cutter truing device.

The constructional details and various advantages of my invention will be pointed out more at length in the course of the following description taken with reference to the accompanying drawings, in which I have shown a preferred embodiment of the invention.

In the drawings, Figure 1 shows the apparatus in its operative relation to a cutterhead, looking at the same against the vertical side of the guide bar; Fig. 2 is a transverse sectional view thereof on the line 2—2 Fig. 1; Fig. 3 is a vertical sectional view on the line 3 showing the parts in their preferred inclined position; and Fig. 4 is a fragmentary top plan view, the heads of the adjusting screws being omitted.

For convenience, I have illustrated my invention as applied to the specific kind of guide bar 1 or support shown in my patent above mentioned, the same being pivoted at 2 on a suitable part 3 of the planing machine and provided with longitudinal dove tail ways 4, 5, on which travels a longitudinal sliding tool carriage 6. In this longitudinal carriage is mounted, to be carried thereby as a part of the tool carriage, a tool carrier 7 mounted in vertical dove-tail ways 8 in the slide carriage 6 for free vertical movement transversely of the guide bar 1. At its lower end it carries a truing tool 9 herein shown as a stick of emery clamped between blocks or plates 10, 11, four of said sticks of emery being herein shown as clamped in position on said blocks, which are pivotally mounted on a central bolt 12 and clamped together by bolts 13 so as to hold the sticks of emery in place. At its top the carrier 7 has a laterally extending or overhanging portion 14 in which are mounted a screw follower 15 and a stop screw 16. Said follower screw 15 is for the purpose of following the profile which, as herein shown, consists of a profile or pattern plate 17 supported on a ledge 18 and held immovably clamped by a bolt 19. The upper edge of the profiling plate or pattern plate 17 is shaped to correspond exactly to the cutting edge of the cutters 20 shown in the figures in their relative positions with relation to a cutterhead 21. For still greater accuracy I prefer to interpose a rider 22 having a knife edge to rest on the profiling edge of the plate 17 and normally held against the screw 15 by a spring 23 between its rear end and the part 24 of the carriage. Said rider has a horizontal portion 25 pivoted at 26 to the carriage 6 and the latter is reciprocated by a threaded rod or feed screw 27 herein shown as operated by a crank 28. The screw 16 is provided to be screwed down against the adjacent edge of the carriage 6 whenever it is desired to stop the normal transverse profiling movement of the carrier 7 so as to use the truing device for truing straight-edge cutters. The free end of the guide bar 1 is clamped and supported in the same manner as shown in my patent before mentioned, by a plate 29, hand screw 30, and adjusting screw 31.

In use, the parts having been properly adjusted, the operator simply turns the crank 28 so as to move the slide carriage back and forth on the guide ways 4, 5, and as this movement takes place the transversely moving carrier plate 7 is caused automatically to rise and fall under the control of the profile or pattern plate 17 whose shaped top edge causes the parts 25 and 15 to rise and fall thereby carrying with them the carrier 7 and truing tool or emery stick 9 which thereby quickly brings all the cutters 20 of the rapidly rotating cutterhead into accurately trued condition. If a cutterhead with straight knives is to be trued, the follower screw 15 is screwed upwardly out of the way, the rider 22 being automatically raised correspondingly by its spring 24, and the stop screw 16 is then screwed down against the carriage 6 so as to adjust the emery knife into exactly such position as is required for the straight knife cutterhead, and thereupon the carriage and truing tool are reciprocated back and forth by the screw 27 the same as before excepting that, inasmuch as the screw 16 is screwed down, there is no transverse movement of the truing tool 9 which remains stationary with relation to the rest of the carriage.

It will be understood that my invention is applicable to the various forms of cutterheads and kinds of planing machines and that accordingly I am not limited to the constructional details herein shown as stated preferred embodiments of the invention, excepting as otherwise required by certain of the more limited claims.

Having described my invention, what I claim as new and desire to secure by Letters Patent, is:

1. In a wood planer, a truing apparatus for truing a shaped cutter having an indented edge, comprising a truing tool, supporting means for said truing tool movable longitudinally of said cutter, and controlling mechanism for guiding the engaging end of said tool in and out transversely of said longitudinal movement in accordance with the required shape to which said cutter is to be trued.

2. In a wood planer, a truing apparatus, comprising a truing tool to engage the indented edge of a shaped cutter, supporting means for said truing tool movable longitudinally of said cutter, and controlling mechanism including a pattern member for giving said tool a transverse movement simultaneously with said longitudinal movement, in accordance with the desired shape of the cutterhead.

3. In a wood planer, a truing apparatus, comprising a truing tool to engage the indented edge of a shaped cutter, supporting means for said truing tool movable longitudinally of said cutter, and controlling mechanism including a profile plate having an edge corresponding in shape to the desired shape of the cutter, and means movable with said tool for engagement with said shaped edge to correspondingly move the tool as the latter is moved longitudinally of the cutter.

4. In a wood planer, guiding means extending lengthwise of a cutterhead whose cutters are to be trued, a carriage mounted to move on said guiding means, a truing tool carried by said carriage, and means providing said tool with a predetermined movement on said carriage transversely of said guiding means in accordance with the desired shape of the cutters.

5. In a wood planer, guiding means extending lengthwise of a cutterhead whose cutters are to be trued, a carriage mounted to move on said guiding means, a tool carrier transversely movable on said carriage, a truing tool mounted on said carrier, and controlling means for moving said carrier and tool toward and from the cutterhead as the carriage reciprocates longitudinally thereof.

6. In a wood planer, guiding means extending lengthwise of a cutterhead whose cutters are to be trued, a carriage mounted to move on said guiding means, a tool carrier transversely movable on said carriage, a truing tool mounted on said carrier, and controlling means including a profile plate for moving said carrier and tool toward and from the cutterhead as the carriage reciprocates longitudinally thereof.

7. In a wood planer, guiding means extending lengthwise of a cutterhead whose cutters are to be trued, a carriage mounted to move on said guiding means, a tool carrier transversely movable on said carriage, a truing tool mounted on said carrier, and controlling means including a stationary profile plate on said guiding means, and an adjustable follower on said carriage, for moving said carrier and tool toward and from the cutterhead as the carriage reciprocates longitudinally thereof.

8. In a wood planer, a guide bar extending lengthwise of a cutterhead whose cutters are to be trued, a truing tool movable on said guide bar, controlling means for giving said tool a movement toward and from the cutterhead in connection with said longitudinal movement, and means for rendering said controlling means inoperative and maintaining said tool in a rectilinear movement parallel with said cutterhead.

9. In a wood planer, a truing tool, means to guide said truing tool longitudinally of a cutterhead whose cutters are to be trued, and means for providing said tool with a movement toward and from the cutters in connection with said longitudinal movement, including a profile plate and a knife edge follower device for sliding on said profile plate and thereby moving the tool in accordance therewith.

10. In a wood planer, a truing tool, means to guide said truing tool longitudinally of a cutterhead whose cutters are to be trued, a carriage movable on said guiding means, a feed screw for feeding said carriage on said guiding means, a truing tool movable with said carriage, and means for automatically moving said tool toward and from the cutterhead as said feed screw operates.

11. In a wood planer, guiding means for guiding a truing tool with relation to the cutters of a cutterhead which are to be trued, a pivoted tool carrier, clamping means therefor, and a plurality of tools carried by said carrier in position to be brought successively, as desired, into operative position for truing said cutters.

In testimony whereof, I have signed my name to this specification, in the presence of two subscribing witnesses.

CHARLES W. H. BLOOD.

Witnesses:
WILLIAM O. VIRARTTAS,
CARL G. OSTEMAN.